(12) United States Patent
DeZorzi et al.

(10) Patent No.: US 6,879,252 B2
(45) Date of Patent: Apr. 12, 2005

(54) METHOD AND APPARATUS FOR ASSOCIATING TIRES WITH TIRE LOCATIONS OF A VEHICLE

(75) Inventors: Timothy DeZorzi, South Lyon, MI (US); David G. E. Myatt, Leafield (GB)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 10/320,022

(22) Filed: Dec. 16, 2002

(65) Prior Publication Data

US 2004/0095233 A1 May 20, 2004

Related U.S. Application Data

(60) Provisional application No. 60/426,130, filed on Nov. 14, 2002.

(51) Int. Cl.$^7$ ............................................... G08B 26/00
(52) U.S. Cl. ........................ 340/505; 340/10.1; 340/447
(58) Field of Search .................................. 340/505, 442, 340/445, 447, 10.1–10.42

(56) References Cited

U.S. PATENT DOCUMENTS

| | | | |
|---|---|---|---|
| 3,873,965 A | 3/1975 | Garcia | 340/447 |
| 4,319,220 A | 3/1982 | Pappas et al. | 340/447 |
| 5,285,189 A | 2/1994 | Nowicki et al. | 340/447 |
| 5,602,524 A | 2/1997 | Mock et al. | 340/447 |
| 5,612,671 A | 3/1997 | Mendez et al. | 340/447 |
| 5,880,363 A | 3/1999 | Meyer et al. | 73/146.5 |
| 6,340,930 B1 | 1/2002 | Lin | 340/447 |
| 6,489,888 B1 * | 12/2002 | Honeck et al. | 340/442 |
| 6,597,284 B2 * | 7/2003 | Juzswik | 340/442 |
| 6,630,885 B2 * | 10/2003 | Hardman et al. | 340/505 |
| 6,693,522 B2 * | 2/2004 | Tang et al. | 340/445 |
| 6,765,484 B2 * | 7/2004 | Eagleson et al. | 340/505 |
| 2002/0101340 A1 | 8/2002 | Starkey | 340/447 |
| 2003/0197603 A1 * | 10/2003 | Stewart et al. | 340/442 |

FOREIGN PATENT DOCUMENTS

FR      2826731 A1 * 1/2003     B60C/23/00

* cited by examiner

*Primary Examiner*—Daniel Wu
*Assistant Examiner*—Sihong Huang
(74) *Attorney, Agent, or Firm*—Tarolli, Sundheim, Covell & Tummino L.L.P.

(57) ABSTRACT

An apparatus for associating tires with tire locations of a vehicle includes two sensors, each sensor having an associated tire. Each sensor transmits an associated sensor identification in response to receipt of an interrogation signal. The interrogation signal is provided so that the two sensors transmit at different rates. A controller is responsive to receipt of transmitted identification signals for associating each sensor with a tire location and thereby associating the tires with tire locations of the vehicle.

11 Claims, 1 Drawing Sheet

METHOD AND APPARATUS FOR ASSOCIATING TIRES WITH TIRE LOCATIONS OF A VEHICLE

This application claims the benefit of Provisional application Ser. No. 60/426,130, Nov. 14, 2002.

TECHNICAL FIELD

The present invention is directed to a method and apparatus for associating tires with tire locations of a vehicle and is particularly directed to a method and apparatus for determining sensor location in a tire pressure monitoring system using interrogators.

BACKGROUND OF THE INVENTION

Tire pressure monitoring ("TPM") systems are known in the art. TPM systems include a tire condition sensor which may be located within the tire for monitoring tire conditions such as tire pressure and temperature. The sensor includes an associated transmitter for transmitting a radio frequency ("RF") signal indicative of the sensed tire condition. As part of the transmitted signal from the sensor, a unique sensor identification is provided. Each sensor of a TPM system has an associated, unique sensor identification code. The TPM system further includes a receiver for receiving the sensor signals and for controlling a display within the vehicle cabin to indicate to the vehicle operator the condition of the vehicle tires. For the receiver to display tire information for a particular tire location on the vehicle, the receiver must be programmed to match the sensor identification with its associated tire location. Whenever tires are rotated or sensors replaced, the receiver must be reprogrammed to "learn" the sensor identification at each tire location.

TPM systems have been proposed that include interrogators at each tire location. Each interrogator sends an interrogation signal to its associated TPM sensor. The sensors respond and transmit its sensor ID so that the receiver can match the ID with the tire location. One proposed system uses low frequency ("LF") interrogators to provide a short range LF signal that is received only by the sensor associated with that LF interrogator.

Having a LF interrogator for each associated tire location adds to the cost of the TPM system.

SUMMARY OF THE INVENTION

In accordance with one exemplary embodiment of the present invention, an apparatus is provided for associating tires with tire locations of a vehicle. The apparatus comprises two sensors, each sensor having an associated tire. Each sensor transmits an associated sensor identification in response to receipt of an interrogation signal. Means provides the interrogation signal so that the two sensors transmit at different rates. Control means responsive to receipt of transmitted identification signals associates each sensor with a tire location and thereby associates the tires with tire locations of the vehicle.

In accordance with another exemplary embodiment of the present invention, a method is provided for associating tires with tire locations of a vehicle, said method comprising the steps of providing two sensors, each sensor having an associated tire, transmitting an associated sensor identification from each sensor in response to receipt of an interrogation signal, providing the interrogation signal so that the two sensors transmit at different rates, receiving the transmitted identification signals, and associating each sensor with a tire location and thereby associating the tires with tire locations of the vehicle.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Figure 1:
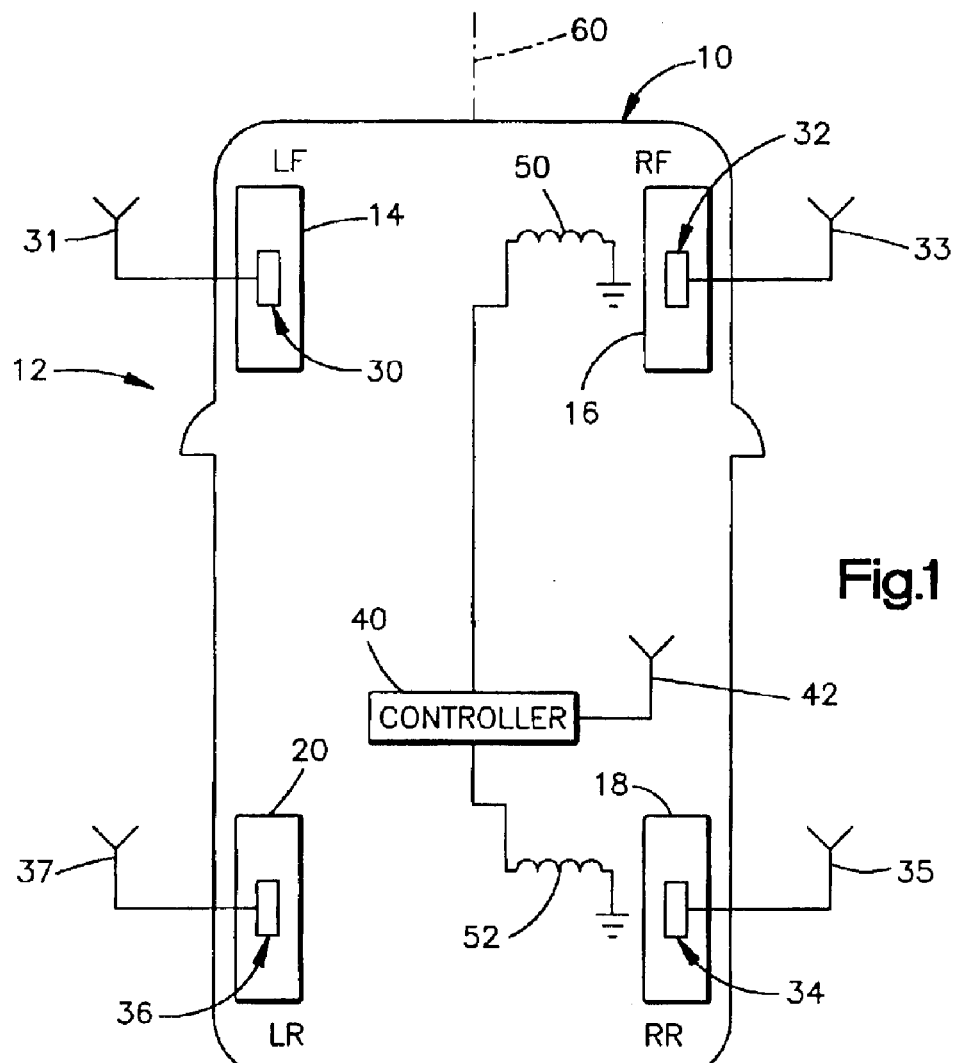
FIG. 1 is a schematic illustration of a vehicle having a tire pressure monitoring systems in accordance with the present invention.

Referring to FIG. 1, a vehicle 10 includes a tire condition monitoring apparatus 12 for sensing at least one condition of each of the vehicle tires 14, 16, 18, 20. The sensed tire condition can include tire pressure and/or temperature. Each tire 14, 16, 18, and 20 includes an associated tire condition sensor 30, 32, 34, and 36, respectively, mounted, for example, within the tire either to the inside of the valve stem or to the associated tire rim.

The sensors 30, 32, 34, and 36 each include one or more antennas 31, 33, 35, and 37, respectively, for receiving low frequency ("LF") interrogation signals and transmitting radio frequency ("RF") tire condition signals. Typically, two separate antennas would be used, one being shown for simplicity.

In response to receiving a LF interrogation signal, the sensors 30, 32, 34, and 36, sense a tire condition, e.g., tire pressure, of its associated tire and transmits a RE tire condition signal including both the sensed tire condition information and sensor identification ("ID") that is unique to that tire condition sensor. Each tire condition sensor 30, 32, 34, and 36 has a different sensor ID. The sensors could be arranged to transmit only its ID in response to receipt of an interrogation signal.

The tire condition monitoring apparatus further includes a controller 40 having a RF receiving antenna 42 for receiving tire condition signals from tire sensors 30, 32, 34, and 36. In accordance with one exemplary embodiment of the present invention, the controller 40 is connected to two LF interrogator antennas 50, 52.

The interrogator antenna 50 is associated with the vehicle's front wheels 14, 16, and, in turn, sensors 30, 32. The vehicle 10 has a central, front-to-rear axis 60. The interrogator antenna 50 is mounted on one side of the axis 60 so as to be non-equal distances from sensor 30 of wheel 14 and the sensor 32 of wheel 16.

The interrogator antenna 52 is associated with the vehicle's rear sensors 34, 36 of wheels 18, 20, respectively. The interrogator antenna 52 is mounted on one side of the axis 60 so as to be non-equal distances from sensors 34 and 36. The interrogator antenna 52 could be mounted on the same side of the axis 60 as antenna 50 or on a different side.

In accordance with one embodiment of the present invention, the controller causes an LF interrogation signal to be periodically output via the antenna 50. The intensity of the LF interrogation signal from the antenna 50 is relative low. As the tires 14, 16 rotate, the sensors 30, 32 get closer to and farther from the antenna 50.

Figure 2:
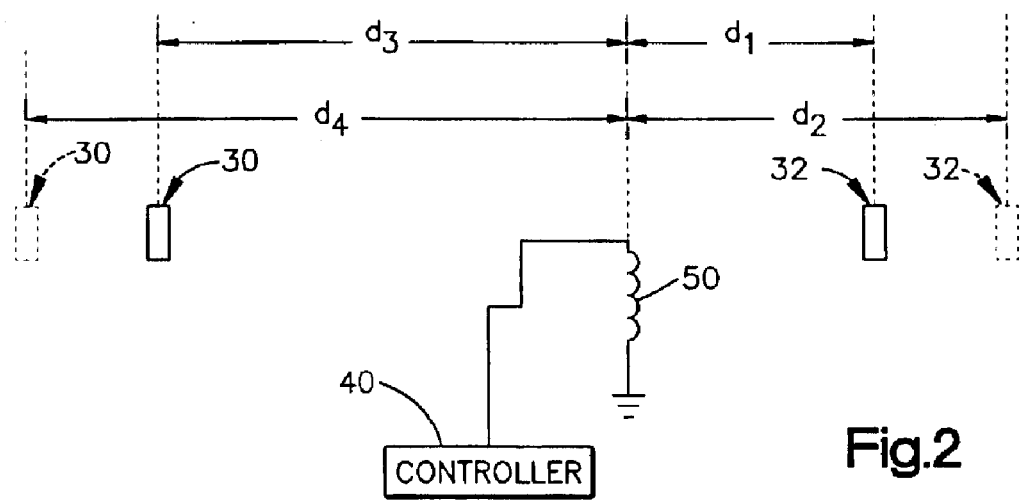
FIG. 2 is an illustration showing changes in sensor distance from an interrogation antenna during tire rotation.

Referring to FIG. 2, as the tire 16 rotates, the sensor 32 moves between a closest distance $d_1$ to a farthest location $d_2$.

The field strength of the LF interrogation signal from antenna 50 is large enough that the sensor 32 "sees" the interrogation signal each time it is transmitted and responds with transmission of a tire condition signal. Therefore, the sensor 32 responds at a rate equal to the rate of the interrogation signal.

As the tire 14 rotates, the sensor 30 moves between a closest distance $d_3$ to a farthest location $d_4$. The field strength of the LF signal from antenna 50 is such that the sensor 30 will "see" the interrogation signal only when the sensor is at the distance $d_3$ and will not "see" the interrogation signal when the sensor is at the distance $d_4$. The interrogation signal extends to a distance between $d_3$ and $d_4$. Therefore, the sensor 30 will only periodically see the interrogation signal and transmit a tire condition signal at a rate less than the rate of sensor 32. It should be appreciated that the interrogation signal non-uniformly communicates with the two sensors 30, 32 as the tires 14, 16 rotate thereby providing different rates for the two associate ID's from the sensors.

Because the LF antenna 50 is periodically activated, the distances between the sensors 30, 32 change relative to the LF antenna 50, and the LF interrogation signal strength is limited, it is more likely that the sensor 32 will "see" and respond to more LF interrogations than will the sensor 30. Therefore, during such periodic activation of the LF antenna 50, sensor 32 will transmit its tire condition signal and sensor ID more often (at a higher rate) than sensor 30. The controller 40 then can determine the location of sensor 32 and sensor 30 by comparing the number of received tire condition signals from each of the sensors. The most received tire condition signals (and, therefore, sensor ID) is the location of sensor 32 and the least received tire condition signals (sensor ID) must be the location of sensor 30. Therefore, the controller can determine the sensor ID for the right front wheel and the sensor location of the left front wheel.

A similar process is then used to determine the sensor locations for the left rear and the right rear tires since the LF antenna 52 is closer to the sensor 34 than the sensor 36.

In accordance with another embodiment of the present invention, the LF antennas 50, 52 are mounted as shown in the arrangement of FIG. 1, i.e., the LF antennas are mounted off-set from the central axis 60 of the vehicle 10 so as to be non-equally spaced from their two associated tire condition monitoring devices. The controller periodically outputs LF interrogation signals via the antenna 50 having differing signal strengths. The first signal strength is relatively low intensity and provides communication only with the sensor 32. The sensor 32 "sees" the first interrogation signal and transmits the tire condition signal including the sensor ID. Next, the controller outputs a second LF interrogation signal at a second larger intensity so that both sensors 30, 32 "see" the interrogation signal and respond by transmission of their associated tire condition signals. The controller monitors and associates the sensor ID most often received (higher rate transmission) as being that of the sensor 32 located at the right front tire location. The controller monitors and associates the tire condition signal least often received (low rate transmission) as being the sensor 30 located at the left front tire location. The process is then repeated for the rear tire locations in which the ID signal most often received will be from the right rear tire location and the least often received ID signal will be the left rear tire location.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for associating tires with tire locations of a vehicle, said apparatus comprising:
    two sensors, each sensor having an associated tire, each sensor transmitting an associated sensor identification in response to receipt of an interrogation signal;
    means for providing said interrogation signal to cause said two sensors to transmit at different rates; and
    control means responsive to reception rates of identification signals transmitted from the sensors for associating each sensor with a tire location and thereby associating the tires with tire locations of the vehicle.

2. The apparatus of claim 1 wherein said means for providing said interrogation signal includes an interrogation antenna mounted relative to said two sensors at non-equal distances.

3. The apparatus of claim 2 wherein said control means associates sensor location, and thereby, tire location, in response to a number of transmitted sensor identifications received from each of said two sensors.

4. The apparatus of claim 3 wherein said rate of sensor transmission is responsive to tire rotation.

5. The apparatus of claim 2 wherein said means for providing interrogation signals further includes means for alternating signal strength of said interrogation signal over time, and wherein said control means associates sensor location, and, in turn, tire location, with a number of transmitted sensor identifications received from each of said two sensors.

6. A method for associating tires with tire locations of a vehicle, said method comprising the steps of:
    providing two sensors, each sensor having an associated tire;
    transmitting an associated sensor identification from each sensor in response to receipt of an interrogation signal;
    providing the interrogation signal to cause the two sensors to transmit at different rates;
    providing the interrogation sign that the two sensors transmit at different rates;
    receiving the transmitted identification signals; and
    associating each sensor with a tire location in response to a reception rate of received identification signals and thereby associating the tires with tire locations of the vehicle.

7. The method of claim 6 wherein said step of providing the interrogation signal includes mounting an interrogation antenna relative to the two sensors at non-equal distances.

8. The method of claim 7 wherein said step of associating sensor location, and thereby, tire location, is response to a number of transmitted sensor identifications received from each of the two sensors.

9. The method claim 8 wherein the rate of sensor transmission is responsive to tire rotation.

10. The method of claim 7 wherein said step of providing interrogation signals further includes the step of alternating signal strength of the interrogation signal over time, and wherein said step of associating sensor location, and, in turn, tire location, is responsive to a number of transmitted sensor identifications received from each of the two sensors.

11. An apparatus for associating tires with tire locations of a vehicle, said apparatus comprising:
    first and second sensors, each of said first and second sensors having an associated tire and transmitting associated signals in response to receipt of interrogation signals;
    means for providing said interrogation signals so that said interrogation signals are received by said first sensor at a first rate and are received by said second sensor at a second rate that is different from the first rate, said first sensor being responsive to said interrogation signals for transmitting its associated signals at the first rate and said second sensor being responsive to said interrogation signals for transmitting its associated signals at the second rate; and control means responsive to reception rates of said associated signals transmitted by said first and second sensors for associating said first and second sensors with tire locations and thereby associating the tires with tire locations of the vehicle.

* * * * *